United States Patent [19]

Faul et al.

[11] Patent Number: 4,596,752
[45] Date of Patent: Jun. 24, 1986

[54] ELECTROCHEMICAL CELL STRUCTURES AND MATERIALS THEREFOR

[75] Inventors: Ian Faul, Farnham; Andrew J. Golder, Aldershot, both of England

[73] Assignee: The Secretary of State for Defence in Her Britannic Majesty's Government of the United Kingdom of Great Britain and Northern Ireland, London, England

[21] Appl. No.: 668,856

[22] Filed: Nov. 6, 1984

[30] Foreign Application Priority Data

Nov. 7, 1983 [GB] United Kingdom ................. 8329701

[51] Int. Cl.⁴ ............................................. H01M 4/36
[52] U.S. Cl. .................................... 429/103; 429/112; 429/199; 429/218

[58] Field of Search ................ 429/112, 103, 199, 218

[56] References Cited

U.S. PATENT DOCUMENTS 4,315,059 2/1982 Raistrick et al. ..................... 429/112
4,340,652 7/1982 Raistrick et al. ..................... 429/112

Primary Examiner—Charles F. Lefevour
Attorney, Agent, or Firm—Cushman Darby & Cushman

[57] ABSTRACT

An electrochemical cell system suitable for use in a thermal battery based on a cathode incorporating an active material consisting of a mixture of $LiV_2O_5$ and $VO_2$, is disclosed. The cathode material is intended primarily for use in cells with lithium or lithium alloy anodes and lithium halide electrolytes.

10 Claims, 5 Drawing Figures

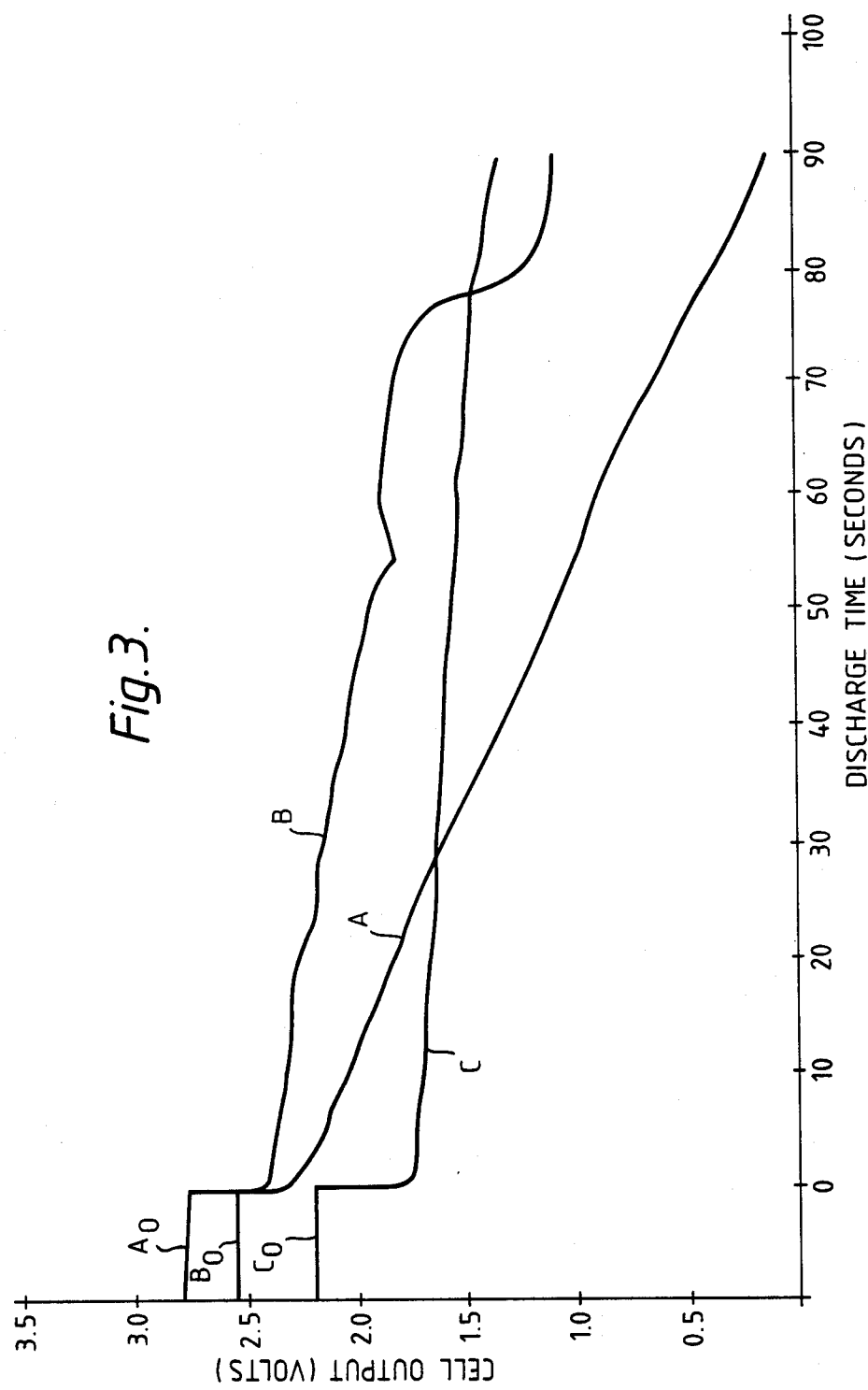

ELECTROCHEMICAL CELL STRUCTURES AND MATERIALS THEREFOR

The present invention relates to electrochemical cell structures for use in thermal batteries and materials therefor.

Thermal batteries are primary electrical sources which are normally used in a 'one-shot' mode to generate a single continuous energy output once activated. The duration of the output may vary from a few seconds to about an hour depending on the battery design and construction. These batteries are frequently used as powder sources for guided missiles and other weapon systems.

Thermal batteries are formed from a series construction of electrochemical cells each of which has an inert state and a thermally activated state. The inert state, in which the cell is normally stored, exists when the cell electrolyte between the anode and cathode is in a solid condition, eg at ambient temperature. The thermally activated state exists when the electrolyte is molten. The thermally activated state may be obtained rapidly when required by the ignition of a charge of a pyrotechnic in close proximity to the electrolyte. The temperature of the cell in the thermally activated state is typically 450° C. to 600° C.

Known thermal batteries of current commercial interest usually employ the following particular cell construction (although other constructions are known). The anode is provided by a layer of lithium either in the form of the pure metal held in a support (since the metal is liquid in the thermally activated state) or in the form of an alloy, eg with boron, silicon, or aluminium. The cathode is a disc of $FeS_2$. The electrolyte is a pressed powder pellet comprising a eutectic mixture of LiCl and KCl or of LiF, LiCl, and LiBr. The electrolyte is incorporated within an inert binder such as MgO to immobilise it when molten.

The pyrotechnic is a mixture of iron and potassium perchlorate located in the form of a pellet adjacent to the cell.

Several cells are arranged as a stack in this way in the battery, each cell having its own pyrotechnic pellet, ie adjacent cells being separated by pyrotechnic pellets. The stack is assembled in a dry atmosphere and is enclosed by material providing a thermal blanket, eg insulating end pads and a jacket moulded from a silica glass. The enclosed stack is then hermetically sealed within a steel case.

The conventional cathode material $FeS_2$ is a widely available and relatively inexpensive material and in conjunction with a lithium based anode and an electrolyte containing one or more lithium salts, provides a reasonable cell output performance.

The present invention comprises a thermal cell having an active cathode material which in the pre-discharge or charged condition of the cell comprises a mixture of $VO_{2\pm z}$ and $Li_yV_2O_5$ wherein $0.88 \leq y \leq 1$ and $0 \leq z 0.05$.

This thermal cell system is intended for use with an anode which is of the type capable of providing a displacement of lithium ions into the electrolyte on discharge, eg an anode comprising lithium metal or a lithium alloy. The intended electrolyte is one capable of transporting lithium ions from the anode to the cathode eg a lithium salt, a mixture of salts including at least one lithium salt, or an alkyl pyridium halide.

It is known to use an oxide of vanadium such as $V_2O_5$ or $V_6O_{13}$ as cathode material in ambient temperature lithium secondary cells. It is also known to use $V_2O_5$ as cathode material in thermal cells with magnesium and calcium anodes. U.S. Pat. No. 4,315,905 mentions that lower oxides of vanadium are useful in thermal cells. However the cathode composition of the present invention comprises a mixture of a vanadium oxide—$VO_2$—and lithium vanadate—$LiV_2O_5$ and this mixture provides an improvement in electrical properties when compared with similarly constructed cells having cathodes comprising $FeS_2$ or lithium vandate, or vanadium oxide, alone.

This provides a higher output power density for a given size of battery and therefore allows batteries of smaller size and weight to be made which give the same output as currently available batteries. Reduced size and weight are highly desirable features of batteries for advanced aerodynamic systems such as guided missiles.

The oxide of vanadium known as $VO_2$ (alternatively referred to as $V_2O_4$ in the scientific literature) may in fact have an atomic ratio of V:O which differs slightly from 1:2.00. This accounts for z specified above. However, for simplicity, $VO_{2\pm z}$ will hereinafter be referred to as as "$VO_2$".

The $VO_2$ in the above specified composition is preferably (although not necessarily) of the form obtained as one component of the product of Method 2 specified below or a similar form. X-ray diffraction analysis has revealed that this form is similar to that obtained by: (i) the vacuum pyrolysis of anhydrous $VOSO_4$ at 620° C. as described by J Tudo in Revue de Chimie Minerale, 2, (1965) pages 53–117, especially page 84, hereinafter referred to as Reference 1; and to that obtained by (ii) heating equimolar amounts of $V_2O_3$ and $V_2O_5$ in a sealed tube at over 650° C. for several hours as described by G Andersson in Acta Chemica Scandinavica, 8, (1954), pages 1599–1606 especially page 1600, hereinafter referred to as Reference 2. Thus, the $VO_2$ may be of the form obtained by one of these methods or a similar form obtained in another known way.

In Reference 2 the $VO_2$ obtained by the method described therein is referred to as monoclinic although it is now known that this form is monoclinic only below 70° C. (in contrast to the $VO_2$(B) from which is another form known to be monoclinic up to higher temperatures).

The $VO_2$ may alternatively be obtained by the further known method involving the fusion of $V_2O_5$ with oxalic acid or by that involving the reduction of $V_2O_5$ by a reducing gas such as $H_2$ or $SO_2$.

Other forms of $VO_2$, are suitable and in any event, the $VO_2$ may be obtained commercially.

The $Li_yV_2O_5$ in the above active cathode material is desirably (although not necessarily) the form of $Li_yV_2O_5$ known as $\gamma$-$LiV_2O_5$ which may be produced by the known method described by Murphy et al in Inorganic Chemistry, 18, (10), 1979, pp 2800–2803, herein referred to as Reference 3, wherein $V_2O_5$ is reduced at ambient temperature by lithium iodide in acetonitrile.

The active cathode material of the invention may contain the two components in a wide range of admixture ratios. However for each of the components to yield a beneficial contribution to the mixture it should contribute at least one quarter by weight to the total. In addition to the aforementioned components, which are the essence of the active cathode material, the material may include up to 10 percent other oxides of vanadium or other vandates, as incidental constituent without significant detriment.

The active cathode material may be made in one of the following ways:

Method 1: Separately (i) preparing $VO_2$, eg by one of the methods described above, or obtaining the compound, and (ii) preparing $Li_yV_2O_5$, eg by the method of Reference 3 and intimately mixing appropriate amounts of the two products as powders.

Method 2: Reducing powdered $V_6O_{13+x}$, $0 \leq x \leq 0.5$ by the action of heat in the presence of one or more oxidisable salts of lithium, eg one or more lithium halides. The result is typically a fused mass which may be broken into a powder of the required composition. The $V_6O_{13+x}$ may be obtained in a known way, eg by (i) reducing $V_2O_5$ by heating $V_2O_5$ in the presence of V or (ii) by the thermal decomposition of ammonium metavanadate in the presence of a flowing inert gas such as argon.

For a composition made by Method 2, or by Method 1 wherein components having a similar microstructure to those obtained by Method 2 are used, the weight ratio of $Li_yV_2O_5:VO_2$ present in the composition is preferably in the range from 1:3 to 1:1, especially from 1:2 to 1:1.5.

Where the composition is made by Method 2 using $V_6O_{13+x}$ produced by the decomposition of ammonium metavanadate the $V_6O_{13+x}$ is likely to contain minor amounts (eg a few percent) of impurities such as $VO_2$ and $V_3O_7$. However, it has been found that these do not seriously affect the performance of the final composition produced by Method 2.

In Method 2 the $V_6O_{13+x}$ may be reduced in the presence of LiBr or a mixture including LiBr, eg of LiBr and LiCl, or of LiBr, LiCl and LiF.

Where the mixture is of LiBr and LiCl it preferably contains from 20 to 40% by weight of LiCl, eg 30% by weight of LiCl.

Preferably (although not essentially) in Method 2 the lithium salt or salt mixture forms between 12 and 40% of the weight of the overall mixture with $V_6O_{13+x}$. For perfect stoichiometry using LiBr and $V_6O_{13}$ approximately 15% by weight LiBr and 85% by weight $V_6O_{13}$ are required to provide the desired reaction:

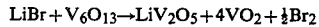
$$LiBr + V_6O_{13} \rightarrow LiV_2O_5 + 4VO_2 + \tfrac{1}{2}Br_2 \qquad \text{Reaction 1}$$

However, it has been found that the ratio of $LiV_2O_5$ to $VO_2$ in the reaction product may show little variation even if the amount of LiBr in the reactant mixture is increased significantly, eg to 30% by weight, especially when $V_6O_{13+x}$ prepared by the decomposition of ammonium metavanadate is used. In fact, the best results have been obtained using 25 to 30% by weight of LiBr in the reactant mixture with $V_6O_{13+x}$ (70 to 75% by weight).

In the thermal cell system of the present invention the active cathode material may form the body of the cathode or it may form a coating on the body when formed of other material, eg a conventional cathode material. In the former case the body of the cathode preferably contains from 20 to 40% by weight, preferably 25 to 35% by weight, of an electrolyte material comprising one or more lithium salts, in addition to the aforementioned electrolyte which is contained between the cathode and the anode. Where the electrolyte between the cathode and the anode comprises one or more lithium salts the electrolyte contained in the cathode preferably is substantially the same electrolyte (excluding any binder). The preferred composition for both the electrolyte, and the electrolyte material in the cathode is the eutectic composition of 22 molar percent LiF, 31 molar percent LiCl, 47 molar percent LiBr. An alternative composition for the electrolyte is a binary eutectic mixture of LiCl and KCl. If this binary material is used for the electrolyte then the tertiary material may be retained for the electrolyte material in the cathode.

In the case where the active cathode material forms the body of the cathode and where the cathode includes also a salt electrolyte material the salt electrolyte material is preferably incorporated in the cathode by intimate admixture of the salt electrolyte material and the cathode body material as powders and forming a pressed pellet from the mixture.

If the oxidisable lithium salt(s) which is used to form the product in Method 2 specified above is the same as the salt(s) which may be incorporated within the final cathode structure as electrolyte salt(s), it needs to be replenished after the reduction process in Method 2 since most of the oxidisable lithium salt(s) will be consumed during the reduction process.

Preferably, the electrolyte between the anode and the cathode in the cell structure according to the first aspect has a melting point less than 650° C., eg in the range of 300° C. to 500° C., desirably 345° C. to 455° C.

This electrolyte may for example comprise the known eutectic mixture of 22 molar % LiF, 31 molar % LiCl and 47 molar % LiBr. This mixture has a melting point of 450° C. This salt, or other electrolyte salt, is preferably mixed with a known binder, preferably MgO or $SiO_2$, to the extent of 50 to 90%, preferably about 65 to 75%, by weight of binder, per unit weight of the overall mixture.

The anode in the cell according to the first aspect of the present invention may be a known lithium based anode, eg comprising pure lithium held in a known container or support, or comprising a suitable known lithium alloy, eg containing one or more of boron, silicon and aluminum.

The anode material may optionally be mixed with electrolyte (eg as admixed powders) or contacted by electrolyte contained in a pad, eg of asbestos.

The content of lithium in the anode material (excluding any electrolyte present) may be in the range 5 to 85% by weight depending on the manner in which the lithium is contained.

If the lithium is contained in an unalloyed state in preferably forms from 5 to 30% of the overall weight of lithium plus support material in which it is contained. The support material is preferably an inert matrix such as an iron mesh or a porous nickel/chromium matrix. Typically, the lithium forms 7 to 8% by weight of such anode materials.

If the lithium in the anode material is provided in the form of an alloy it is preferably selected from:
i. lithium/aluminium alloys containing between 20% and 24% of lithium by weight;
ii. lithium/silicon alloys containing between 44% and 56% of lithium by weight;
iii. lithium/boron alloys containing between 53% and 80% of lithium by weight.

Preferably, the anode, cathode and electrolyte between them are all in the shape of a pellet or disc of similar dimensions to facilitate battery construction.

The present invention also provides a thermal battery comprising a series of at least two electrochemical cell structures as hereinbefore described, adjacent cells in the series being separated by energizable heating layers for heating the cells to convert them from their inert state to their thermally activated state.

The heating layers are preferably pyrotechnic layers in the form of pellets stacked between the cathode and anode of adjacent cells.

The overall construction of the thermal battery of the invention may be similar to that used for the manufacture of conventional thermal batteries having $FeS_2$ cathodes.

Embodiments of the invention will now be described by way of example with reference to the accompanying drawings, in which:

FIGS. 3 and 4 are graphs of cell output voltage versus discharge time for the cell construction shown in FIG. 1.

In the following Examples the symbols which are used have the following meanings:
rt = room temperature (~20° C.)
w/o = percentage by weight compared with the overall weight
TGA = thermal gravimetric analysis.

EXAMPLE 1

Preparation and investigation of a cell using a cathode comprising $V_6O_{13}$.

Step 1a: Preparation of $V_6O_{13}$

Stoichiometric quantities of 47.28 g $V_2O_5$ and 4.08 g vanadium powder were intimately mixed and sealed under vacuum in a silica tube. The tube was then heated in a furnace at a rate to give an increase of temperature of 10 C.° per minute from rt up to 650° C. at which temperature it was held for a further 24 hours. The furnace was cooled to rt over a further 12 hours. The product was a dark blue/black crystalline solid. X-ray diffractometer analysis confirmed that the product was 100% $V_6O_{13}$ a monoclinic structure with lattice constants:

a = 11.922 Å
b = 3.68 Å
c = 10.145 Å
β = 100.87

$V_6O_{13}$ is stable in air at rt and shows no weight loss or gain on TGA in flowing argon up to 700° C.

Step 1b: Preparation of a high temperature cathode material using $V_6O_{13}$ A mixture of 70% (w/o) $V_6O_{13}$ prepared as in Step 1a and 30% (w/o) of a ternary eutectic lithium halide salt, Salt Mixture A, composed of 68.4% (w/o) LiBr, 22.0% (w/o) LiCl, 9.6% (w/o) LiF, was intimately mixed and pressed into the form of pellets at a pressure of about 3 tonnes cm$^{-2}$. Each cathode pellet formed was about 0.3 g in weight and 1.6 cm in diameter.

Step 1c: Preparation of a test cell

Electrolyte/binder pellets were formed by intimately mixing and pressing together as a powder 70% (w/o) MgO and 30% (w/o) of Salt Mixture A. These pellets were similar in dimension to the cathode pellets. Anode pellets were formed by pressing the powdered alloy 24% (w/o) Li: 76% (w/o) Al. These pellets were also similar in dimensions to the cathode pellets.

Figure 1:
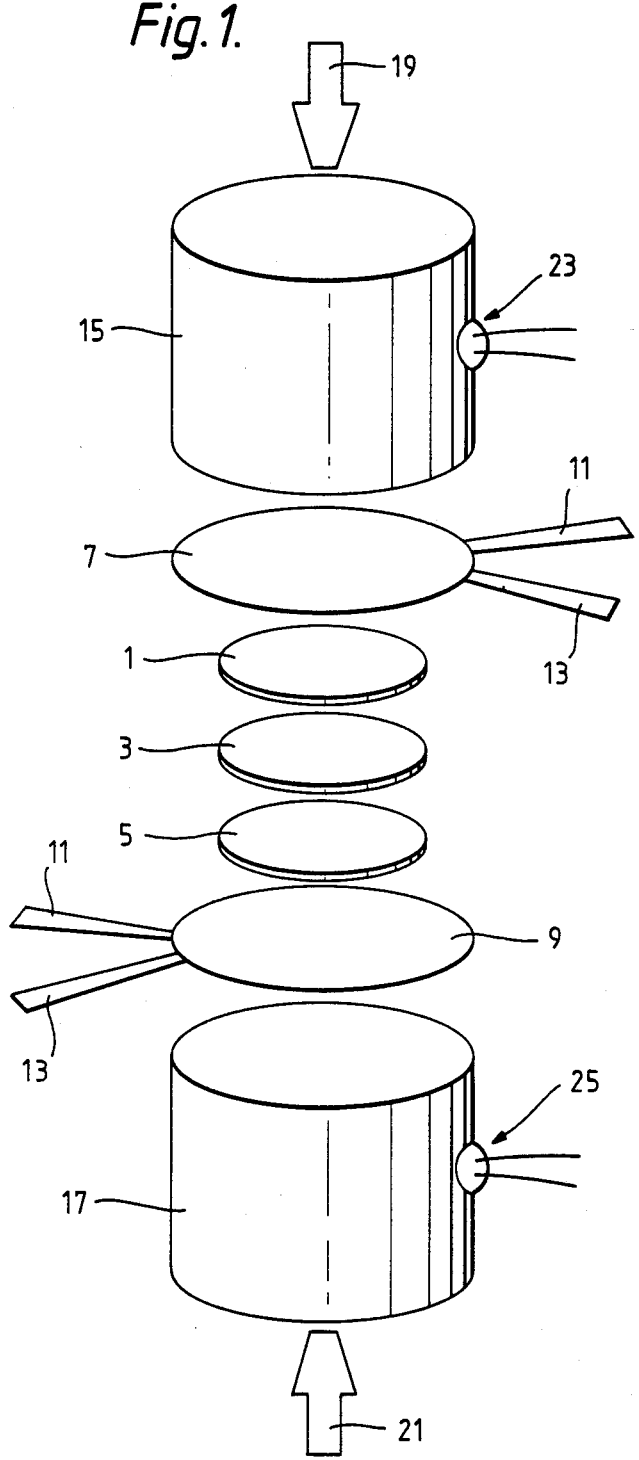
FIG. 1 is an exploded front perspective view of a single test cell construction.

A cathode pellet, an electrolyte/binder pellet and an anode pellet were then arranged in an inert atmosphere of argon to provide an electrochemical cell in the construction shown in FIG. 1. In that Figure these three pellets are indicated by reference numerals 1, 3 and 5 respectively. Iron current collecting discs 7 and 9 are shown in FIG. 1 placed above the cathode pellet 1 and below the anode pellet 5 respectively. The discs 7 and 9 are made of 0.125 mm thick iron and each has a current output lead 11 and a voltage output lead 13. The discs 7 and 9 with the pellets 1, 3 and 5 between them are pressed between boron nitride platens 15, 17 respectively by pneumatic rams 19, 21 respectively at a pressure of about 3 kg cm$^{-2}$. The platens 15, 17 are heated by electrical cartridge heaters 23, 25 respectively.

Step 1d: Investigation of the test cell output performance

Figure 2:
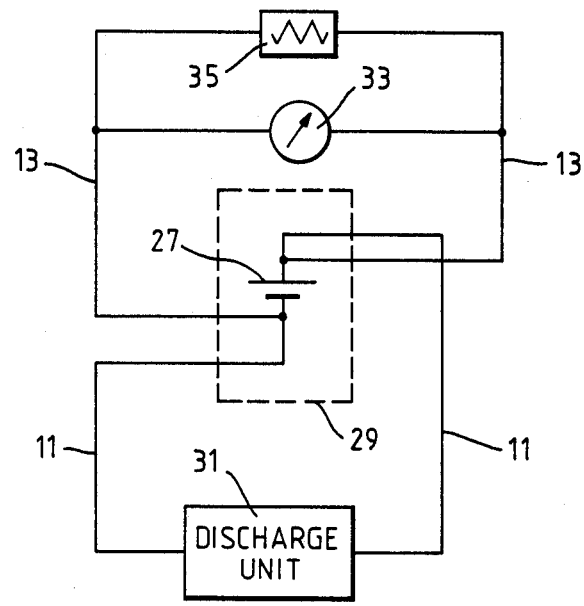
FIG. 2 is a circuit diagram of the discharge circuit used for testing the cell shown in FIG. 1.

The cell formed in Step 1c was heated to a temperature of between 480° C. and 590° C. (by heating the platens 15, 17) under the holding pressure of about 3 kg cm$^{-2}$. The cell comprising the pellets 1, 3 and 5, is indicated by reference number 27 in FIG. 2. The cell was tested using the circuit arrangement shown in FIG. 2. The cell 27 is shown in FIG. 2 contained in an argon atmosphere container 29. The current output leads 11 are shown connected to a discharge unit 31 capable of discharging the cell 27 at any selected constant current between 10 mA and 10 amps. The voltage output leads 13 are shown connected across a voltmeter 33 and also a Y-t (output v time) charge recorder 35 in parallel. The readings on the voltmeter 33 may be used to calibrate the chart recorder 35. After heating the cell 27 to its operational temperature (thermally activated state) the open circuit voltage across the cell 27 was first measured and then the unit 31 was set to give a constant current discharge of 1 amp cm$^{-2}$ of cathode pellet cross-sectional area and the output voltage was recorded on the calibrated chart recorder 35. The results are shown as curve A in FIG. 3, where the open circuit voltage before discharge is shown as portion $A_O$ of curve A at 2.765 volts.

EXAMPLE 2

Step 2a: Preparation of $V_6O_{13\pm x}$, $x \leq 0.2$ 103.48 g of $NH_4VO_3$ were equally divided and placed in two silica boats within a stainless steel furnace of inside dimensions 150 mm diameter and 200 mm depth. The furnace was closed to the atmosphere and high purity argon gas was passed through the furnace at a rate of 1.5 liters per minute. The furnace temperature was raised from rt to 450° C. at a rate of 12 C.° per minute and the furnace was held at 450° C. for 2 hours and then the temperature was raised from 450° C. to 550° C. at a rate of 5 C.° per minute. The furnace was held at 550° C. for a further 2 hours and then cooled to rt over 4 hours.

75.657 g of a dark blue/black crystalline product were obtained. X-ray diffraction analysis showed the product to contain $V_6O_{13+x}$, $VO_2$ and $V_3O_7$.

The decomposition of $NH_4VO_3$ follows the route outlined in the following reactions:

$NH_4VO_3 \rightarrow \frac{1}{2}V_2O_5 + NH_3 + \frac{1}{2}H_2O$  Reaction 2

$\frac{1}{2}V_2O_5 + NH_3 \rightarrow VO_{2.19} +$ oxidation products of $NH_3$  Reaction 3

Step 2b: Investigation of the product of Step 2a

The product of Step 2a was formed into a cathode material as in Step 1b above and a test cell using this cathode material was constructed and investigated as in Steps 1c and 1d. The performance of the cell was similar to that investigated in Step 1d.

EXAMPLE 3

Preparation and investigation of a cell using a cathode comprising a mixed vanadium oxide system ($VO_2/\gamma$-$LiV_2O_5$ composition).

Step 3a: Preparation of a mixed vanadium oxide system

70% (w/o) $V_6O_{13}$ and 30% (w/o) of the Salt Mixture A specified above were intimately mixed and heated in a silica boat within a furnace under flowing argon (4 liters per min) to a temperature of 500° C. at a temperature increase rate of 12 C.° per minute. The temperature of 500° C. was maintained for a further 2 hours. The tube was then cooled to rt over a period of 1 hour. The product was a blue/black friable powder and X-ray diffraction analysis showed it to be a mixture of $LiV_2O_5$, $VO_2$ and $LiF$.

Step 3b: Preparation of a high temperature cathode and cell

An admixture of 70% (w/o) of the product of Step 3a, and 30% (w/o) of Salt Mixture A was formed. This mixture was formed into pellets similar to those formed in Step 1b above and such a pellet was then made into a cell as in Step 1c using an alloy anode pellet formed of 24% (w/o) Li:76% (w/o) Al alloy and a binder/electrolyte pellet comprising MgO 70% (w/o) mixed with Salt Mixture A 30% (w/o).

Step 3c: Investigation of the cell output performance

When heated to a working temperature of between 480° C. and 590° C. in an arrangement similar to that shown in FIG. 1 the cell produced in Step 3b gave an open circuit voltage of 2.59 V and, when discharged at a constant current of 1 amp per cm² of cathode pellet cross-sectional area by the arrangement shown in FIG. 2, the cell gave the output voltage versus time profile plotted as curve B in FIG. 3. The open circuit portion of curve B is labelled as $B_O$ in FIG. 3.

For comparison purposes a cell having a conventional cathode formed of 70% (w/o) $FeS_2$ and 30% (w/o) of Salt Mixture A was constructed in an arrangement similar to that shown in FIG. 1 (the anode pellet and binder/electrolyte pellet being formed as in Step 1b) and this was tested at a working temperature of between 480° C. and 590° C. in the circuit arrangement shown in FIG. 2. This cell gave the output voltage versus time profile plotted as curve C in FIG. 3. The open circuit voltage portion of this curve is labelled as $C_O$ in FIG. 3.

As can be seen in FIG. 3 the cells embodying the invention formed as in Examples 1 and 3 both show, as in curves A and B respectively, a significantly higher on-load voltage compared with the conventional $FeS_2$ cathode cell, represented by curve C, over the discharge time of about 30 seconds.

In any event the cell formed as in Example 3 (curve B) shows the highest on-load voltage and shows an on-load voltage which is considerably higher than that from the conventional $FeS_2$ cathode cell (curve C) for about 75 seconds.

EXAMPLE 4

Figure 4:
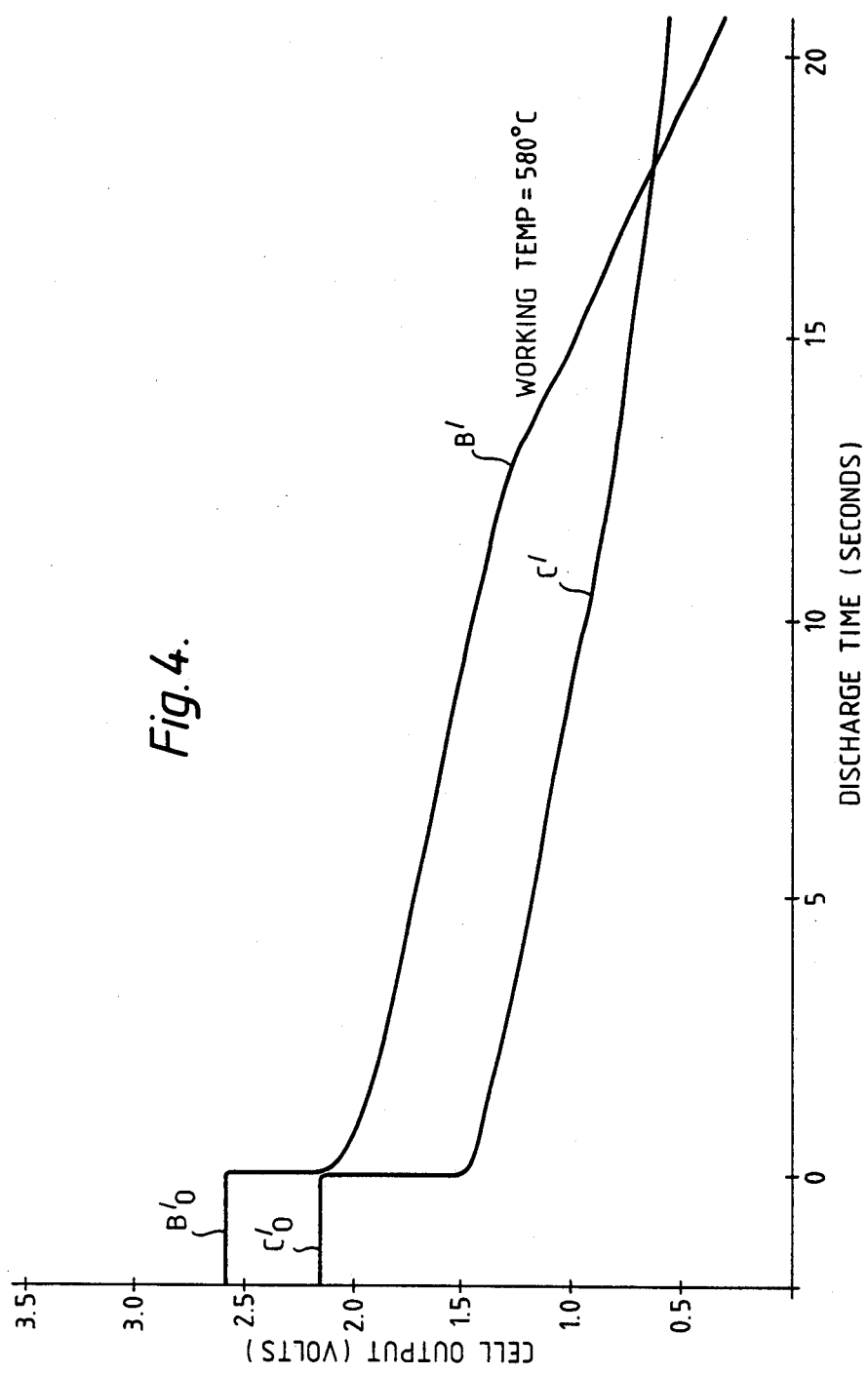

For a cell prepared as in Step 3b the discharge current was increased to 4 amp cm$^{-2}$ in the circuit arrangement shown in FIG. 2. The output voltage versus time for the cell discharged in this way is as shown in FIG. 4 labelled curve $B^1$. The open circuit portion of the curve before discharge is labelled $B^1_O$. The comparative curve for this discharge current using the conventional cell incorporating a $FeS_2$ cathode prepared as described hereinbefore is the curve $C^1$ shown in FIG. 4.

Again, there is a considerable improvement in on-load output voltage obtained by using a cell embodying the present invention, as represented by curve $B^1$, rather than a conventional cell, as represented by curve $C^1$ even though the overall voltage profile in each case is reduced owing to the greater discharge current. In this example of performance, the percentage improvement in output voltage is greater than in the example described above using a smaller discharge current.

EXAMPLE 5

Step 5a: Alternative preparation of a mixed vanadium oxide system ($VO_2$ and $\gamma$-$LiV_2O_5$)

A composition comprising $VO_2$ and $\gamma$-$LiV_2O_5$ was prepared by the reaction of a mixture containing (by weight) between 60 to 85% $V_6O_{13+x}$ prepared as in Step 1a or 1b and (by weight) 15 to 40% LiBr. The overall mixture was heated in a stainless steel furnace under flowing argon at a flow rate of between 1 and 4 liters per minute from rt to 600° C. at a rate of 12 C.° per minute and then held at 600° C. for a further 30 minutes to 2 hours followed by cooling to rt over a period of 2 to 4 hours. The product has been shown to contain $\gamma$-$Li_yV_2O_5$ where y is between 0.88 and 1.0 and $VO_2$ and where the overall amount of $VO_2$ is between 40% and 80% by weight of the product and the overall amount of $Li_yV_2O_5$ is between 20% and 60% by weight of the product.

The overall reaction may be represented by Reaction 1 specified above.

The product made from about 70 weight percent $V_6O_{13+x}$ and 30 weight percent LiBr was further investigated in Step 5b.

Step 5b: Investigation of the product of Step 5a

The product of Step 5a was formed into a cathode material as in Step 3b and the cathode was investigated in a cell as in Step 3c. The cell so produced gave a performance similar to that given by the cell in Step 3c.

EXAMPLE 6

Step 6a: Further alternative preparation of a mixed vanadium oxide system

A similar product to that obtained in Steps 3a and 5a was obtained by reaction of a mixture of 70% (w/o) $V_6O_{13+x}$ prepared as in Example 1 or Example 2 and 30% (w/o) of a binary lithium halide Salt Mixture B, composed of 70% (w/o) LiBr and 30% (w/o) LiCl. This overall mixture was heated in a silica boat under flowing argon to 550° C. and then at 550° C. for 2 hours as in Step 3a. The product again showed $LiV_2O_5$ and $VO_2$ by X-ray diffraction analysis.

Step 6b: Investigation of the product of Step 6a

The product of Step 6a was formed into a cathode material as in Step 3b and the cathode was investigated in a cell as in Step 3c. The cell so produced gave a performance similar to that shown by the cell in Step 3c.

EXAMPLE 7

Step 7a: Further alternative preparation of a mixed vanadium oxide system

Step 7a(i): $VO_2$ was obtained commercially from the Aldrich Chemical Co Ltd. UK (Catalogue No. 21,582.1).

Step 7a(ii): $\gamma\text{-}Li_yV_2O_5$, $0.88 \leq y \leq 1$, was prepared by the known method described by Murphy et al in Reference 3 specified above.

Step 7a(iii): The products of Steps 7a(i) and 7a(ii) were intimately mixed as powders in the following proportions (by weight):

Mixture A: 1:3 $VO_2$:$LiV_2O_5$
Mixture B: 1:1 $VO_2$:$LiV_2O_5$
Mixture C: 3:1 $VO_2$:$LiV_2O_5$ Step 7b Each mixture product of Step 7a was separately made into a cathode material in the manner described in Step 3b and each cathode was investigated in a cell as in Step 3a.

The cells so produced gave a performance illustrated by the results given in Table 1 below.

EXAMPLE 8

$VO_2$ obtained as in Step 7a(i) was itself formed into a cathode material in the manner described in Step 3b and investigated in a cell as in Step 3c.

The cell so produced gave a performance which is illustrated by the results in Table 1 below.

EXAMPLE 9

$\gamma\text{-}Li_yV_2O_5$, $0.88 \leq y \leq 1$, prepared as in Step 7a(ii) was itself formed into a cathode material in the manner described in Step 3b and the cathode was investigated in a cell as in Step 3c.

The cell so produced gave a performance which is illustrated by the results given in Table 1 below.

EXAMPLE 10

$V_3O_7$ is prepared by a known method.

This compound is then formed into a cathode material in the manner described in Step 3b and the cathode is investigated in a cell as in Step 3c.

EXAMPLE 11

$LiV_3O_8$ was prepared by the known method of heating a stoichiometric mixture of $V_2O_5$ and $Li_2CO_3$ in air to 680° C. and maintaining this temperature for 24 hours followed cooling to rt over 12 hours. This reaction is represented by:

$$3V_2O_5 + Li_2CO_3 \rightarrow 2LiV_3O_8 + CO_2 \qquad \text{Reaction 4}$$

This compound was then formed into a cathode material in the manner described in Step 3b and the cathode was investigated in a cell as in Step 3c.

EXAMPLE 12

$VO_2$ obtained by the method of Reference 1 specified above is mixed with $Li_yV_2O_5$ obtained by the method of Reference 3 specified above in various $Li_yV_2O_5$:$VO_2$ weight ratios ranging from 1:9 to 9:1. Each product is separately formed into a cathode material in the manner described in Step 3b and each cathode is investigated in a cell in the manner described in Step 3c.

EXAMPLE 13

$VO_2$ obtained by the method of Reference 2 specified above is mixed with $Li_yV_2O_5$ obtained by method of Reference 3 specified above in various $Li_yV_2O_5$:$VO_2$ weight ratios ranging from 1:9 to 9:1. Each product is separately formed into a cathode material in the manner described in Step 3b and each cathode is investigated in a cell in the manner described in Step 3c.

EXAMPLE 14

$VO_2$ obtained by the known method of fusing $V_2O_5$ with oxalic acid is mixed with $Li_yV_2O_5$:$VO_2$ weight ratios ranging from 1:9 to 9:1. Each product is formed into a cathode material as in Step 3b above and each cathode is investigated as in Step 3c above.

EXAMPLE 15

$VO_2$ obtained by the known method of reducing $V_2O_5$ by $H_2$ or $SO_2$ is mixed with $Li_yV_2O_5$ obtained by the method of Reference 3 specified above in various $Li_yV_2O_5$:$VO_2$ weight ratios ranging from 1:9 to 9:1. Each product is formed into a cathode material as in Step 3b above and each cathode is investigated as in Step 3c above.

The cell so produced gave a performance which is illustrated by the results given in Table 1 below.

The following Table, Table 1 summarises the comparative discharge performance of a variety of cathode materials discharged at 1 amp $cm^{-2}$ of cathode area using a 24 w/o Li/Al alloy anode and Salt Mixture A (specified above) as electrolyte, the cathode being formed of 70% by weight of the material under investigation and 30% by weight of Salt Mixture A.

TABLE 1

| Cathode material under investigation | | Maximum on-load voltage (volts) | Capacity to 2.25 volts in amp-minutes per gram of cathode material under investigation* | Capacity to 2.0 volts in amp-minutes per gram of cathode material under investigation* |
| --- | --- | --- | --- | --- |
| $FeS_2$ | (prior art) | 1.95 | zero | zero |
| $TiS_2$ | (prior art) | 2.10 | zero | 0.47 |
| $V_2O_5$ | (prior art) | | zero | 1.58 |
| $VO_2$ | (Example 8) | 2.15 | zero | 0.87 |
| $V_6O_{13}$ | (Example 1) | 2.30 | 0.31 | 1.66 |
| $\gamma\text{-}LiV_2O_5$ | (Example 9) | 2.15 | zero | 6.19 |
| $\gamma\text{-}LiV_2O_5 + VO_2$ | (Example 5) | 2.45 | 4.24 | 7.93 |
| $\gamma\text{-}LiV_2O_5 + VO_2$ | (Example 7 - | 2.4 | 2.38 | 6.86 |

TABLE 1-continued

| Cathode material under investigation | | Maximum on-load voltage (volts) | Capacity to 2.25 volts in amp-minutes per gram of cathode material under investigation* | Capacity to 2.0 volts in amp-minutes per gram of cathode material under investigation* |
| --- | --- | --- | --- | --- |
| γ-LiV$_2$O$_5$ + VO$_2$ | Mixture A) (Example 7 - Mixture B) | 2.30 | 0.39 | 5.95 |
| γ-LiV$_2$O$_5$ + VO$_2$ | (Example 7 - Mixture C) | 2.30 | 0.31 | 5.32 |
| LiV$_3$O$_8$ | (Example 10) | 2.60+ | 0.55 | 3.62 |

*The value given is the capacity of the active portion of the cathode material excluding the added 30 w/o of electrolyte Salt Mixture A +This value was obtained using a lower discharge current, viz 400 mAmp cm$^{-2}$.

Table 1 illustrates the superior performance of thermal battery cells embodying the present invention compared with those made in accordance with the prior art.

Figure 5:
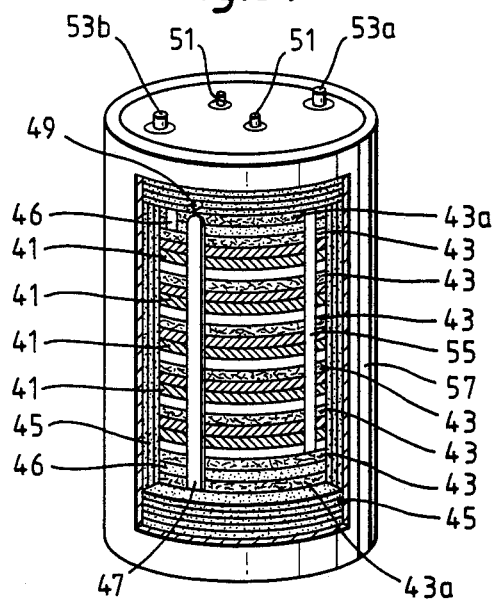
FIG. 5 is a partly cut-away front perspective view of a thermal battery incorporating a cell construction embodying the present invention.

FIG. 5 shows a thermal battery of known general construction incorporating a stack of cells embodying the invention. Each cell, indicated by reference numeral 41, comprises a cathode pellet, an anode pellet and an electrolyte/binder pellet and is formed as in any one of Examples 1 to 11 described above. Adjacent cells 41 are separated by pyrotechnic pellets 43. A thermally insulating jacket 46 is fitted above and below the stack and final pyrotechnic pellets 43a are placed in between individual layers of the jacket 46 at the top and bottom of the stack. A pyrotechnic ignition strip 47 contacts each of the pellets 43 and 43a is ignited by an igniter 49 comprising a pyrotechnic flash pellet operated by an electrical heating wire energised by passing a current between ignition terminals 51. A terminal 53a is connected to the cell 41 at the upper end of the stack whilst a terminal 53b a connecting lead 55 insulated from the stack (eg by a layer of mica). The battery comprising the stack and the thermal jacket 46 is hermetically sealed within a steel container 46, the terminals 51, 53a and 53b being insulated from the container 46 where they emerge from the top of the container 46.

When an appropriate current is passed between the terminals 51a the electrical heating wire within the igniter 49 is heated causing a flash in the flash pellet of the igniter which propagates along the ignition strip 47 and causes the individual pyrotechnic pellets 43 to be ignited rapidly. The cells 41 are all raised to their operating temperature and an output voltage equal to nV, were n is the number of cells in the stack and V is the voltage provided by each for a given load, may be withdrawn from the battery between the terminals 53a and 53b.

We claim:

1. A thermal cell comprising a lithium anode, a molten salt electrolyte and an active cathode material which in the pre-discharge condition thereof is a mixture consisting essentially of a VO$_{2\pm z}$ component and a Li$_y$V$_2$O$_5$ component wherein $0.88 \leq y \leq 1$ and $0 \leq z \leq 0.05$.

2. A thermal cell as claimed in claim 1 having an active cathode material which in the pre-discharge condition thereof is a mixture consisting essentially of a VO$_{2\pm z}$ component and Li$_y$V$_2$O$_5$ component wherein y=1 and $0 \leq z \leq 0.01$.

3. A thermal cell as claimed in claim 2 wherein the active cathode material comprises between one and three parts by weight of the VO$_{2\pm z}$ component for every one part by weight of the Li$_y$V$_2$O$_5$ component.

4. A thermal cell as claimed in claim 3 wherein the Li$_y$V$_2$O$_5$ component is the gamma form of that composition.

5. A thermal cell as claimed in claim 3 wherein the active cathode material is present as a coating upon a conventional cathode material.

6. A thermal cell having a lithium metal or lithium alloy anode, an electrolyte which comprises at least one lithium salt and is contained in an inert binder, and a cathode which comprises an active cathode material in intimate admixture with an electrolyte material comprising at least one lithium salt; wherein the active cathode material, in the pre-discharge condition thereof, is a mixture consisting essentially of a VO$_{2\pm z}$ component and a Li$_y$V$_2$O$_5$ component, the mixture comprising between one and three parts by weight of the VO$_{2\pm z}$ component for every part by weight of the Li$_y$V$_2$O$_5$ component, y being 1 and $0 \leq 1 \leq 0.01$.

7. A thermal cell as claimed in claim 6 in which the electrolyte and the electrolyte material in the cathode are of the same formulation and wherein this comprises a eutectic mixture of 22 molar percent LiF, 31 molar percent LiCl and 47 molar percent LiBr.

8. A thermal cell as claimed in claim 7 in which the electrolyte material in the cathode comprises 25–35 percent by weight of the total of active cathode material and electrolyte therein.

9. A thermal cell as claimed in claim 6 in which the electrolyte comprises a eutectic mixture of LiCl and KCl.

10. A thermal cell as claimed in claim 9 in which the electrolyte material in the cathode comprises a eutectic mixture of 22 molar percent LiF, 31 molar percent LiCl and 47 molar percent LiBr.

* * * * *

UNITED STATES PATENT AND TRADEMARK OFFICE
CERTIFICATE OF CORRECTION

PATENT NO. : 4,596,752
DATED : June 24, 1986
INVENTOR(S) : Ian Faul, Andrew John Golder It is certified that error appears in the above-identified patent and that said Letters Patent is hereby corrected as shown below:

Column 1, line 60, "$0 \leq 0.05$", should read -- $0 \leq Z \leq 0.05$ --.

Column 2, line 6, "Vandium", should read -- vanadium --;
line 12, "vandate", should read -- vanadate --

Column 3, line 1, "vandates", should read -- vanadates --

Column 12, line 41, "$0 \leq 1 \leq 0.01$", should read -- $0 \leq Z \leq 0.01$ --.

Signed and Sealed this

Nineteenth Day of April, 1988

Attest:

DONALD J. QUIGG

*Attesting Officer*  *Commissioner of Patents and Trademarks*